(12) United States Patent
Szczublewski et al.

(10) Patent No.: US 7,346,319 B2
(45) Date of Patent: Mar. 18, 2008

(54) METHOD AND APPARATUS FOR AUDIO RECALL

(75) Inventors: Francis E. Szczublewski, Macomb, MI (US); Laci J. Jalics, Ray, MI (US); Mona L. Toms, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 162 days.

(21) Appl. No.: 10/924,677

(22) Filed: Aug. 24, 2004

(65) Prior Publication Data

US 2006/0046669 A1 Mar. 2, 2006

(51) Int. Cl.
*H04B 1/18* (2006.01)

(52) U.S. Cl. ............... 455/185.1; 455/179.1; 455/158.4; 348/731

(58) Field of Classification Search ............. 455/179.1, 455/180.1–184.1, 185.1, 186.1, 150.1, 151.2–153.2, 455/154.1, 154.2, 155.1–158.4; 348/731
See application file for complete search history.

(56) References Cited

U.S. PATENT DOCUMENTS

| | | | | |
|---|---|---|---|---|
| 5,119,507 A | * | 6/1992 | Mankovitz | 455/154.1 |
| 5,134,719 A | * | 7/1992 | Mankovitz | 455/154.1 |
| 5,564,073 A | * | 10/1996 | Takahisa | 455/3.06 |
| 6,112,063 A | * | 8/2000 | Ravi et al. | 455/186.1 |
| 7,047,548 B2 | * | 5/2006 | Bates et al. | 725/38 |
| 7,107,063 B1 | * | 9/2006 | Bates et al. | 455/456.1 |
| 2002/0152459 A1 | * | 10/2002 | Bates et al. | 725/9 |
| 2003/0032399 A1 | * | 2/2003 | Slupe | 455/161.2 |
| 2005/0227649 A1 | * | 10/2005 | Chestnut et al. | 455/154.1 |

\* cited by examiner

*Primary Examiner*—Blane J. Jackson
(74) *Attorney, Agent, or Firm*—Jimmy L. Funke

(57) ABSTRACT

A system for use in a radio receiver that provides quick access to previously selected audio includes processor logic that evaluates at least a first user-selected audio that has been previously enabled and a second user-selected audio that is currently enabled. An input controller is dynamically coded by the processor logic for recalling audio information associated with the first user-selected audio when the second user-selected audio is being evaluated by the processor logic based upon the length of time the second user selected audio remains in an enabled state. The input controller is an audio recall button located on a user-interface of the receiver and includes an indicia window that displays recall information stored in memory of a processor during the evaluation of the second user-selected audio.

8 Claims, 3 Drawing Sheets

| | Preset Button 1 | Preset Button 2 | Preset Button 3 | Preset Button 4 | Preset Button 5 |
|---|---|---|---|---|---|
| AM (kHz) | 760 | 800 | 950 | 1130 | 1250 |
| FM (MHz) | 88.7 | 93.1 | 96.3 | 97.1 | 101.1 |
| SDARS (GHz) | 2.320 | 2.330 | 2.335 | 2.340 | 2.345 |

METHOD AND APPARATUS FOR AUDIO RECALL

BACKGROUND OF THE INVENTION

1. Field of the Invention

The present application relates to audio devices. More particularly, the present application relates to a method and apparatus that provides quick access to previously selected audio.

2. Description of the Related Art

Receivers are typically used in stationary environments, such as in a house, and in mobile environments, such as in an automobile, for the reception of radio frequencies on different bands. Receivers may also include integral or external hardware associated with supplemental audio devices including, but not limited to, analog cassette tapes, digital compact discs (CD's), and other digital devices, such as a Layer-3 digital audio compression algorithm Motion Picture Experts Group standard device (i.e. an MP3 device).

It is known that conventional receivers often include a plurality of manually-coded preset radio channel buttons. Typically, these manually-coded buttons are grouped on the face of the receiver, proximate a band-toggle button, such as an amplitude modulation (AM)/frequency modulation (FM) button. Prior to receiving radio signals for output over speakers, a user manually codes the preset buttons to their favorite radio stations such that quick, easy access is provided to obviate the manual tuning or scanning of the entire AM or FM band, which ranges from 540 kHz to 1700 kHz in 10-kHz steps and 88.1 MHz to 107.9 MHz in 200-KHz steps, respectively.

Although adequate for most situations, selectable alternatives to AM and FM radio are available on a receiver. For example, a premium subscription service known as Satellite Digital Audio Radio Services (SDARS) is available for most users in addition to the integral or external audio components mentioned above, such as CD's, MP3's, and the like. As such, a need exists for improving conventional receivers so as to provide quick access to previously-selected audio.

BRIEF DESCRIPTION OF THE DRAWINGS

The inventors of the present invention have recognized these and other problems associated with conventional receivers. The present invention will now be described, by way of example, with reference to the accompanying drawings, in which.

DESCRIPTION OF THE PREFERRED EMBODIMENT

Figure 1:
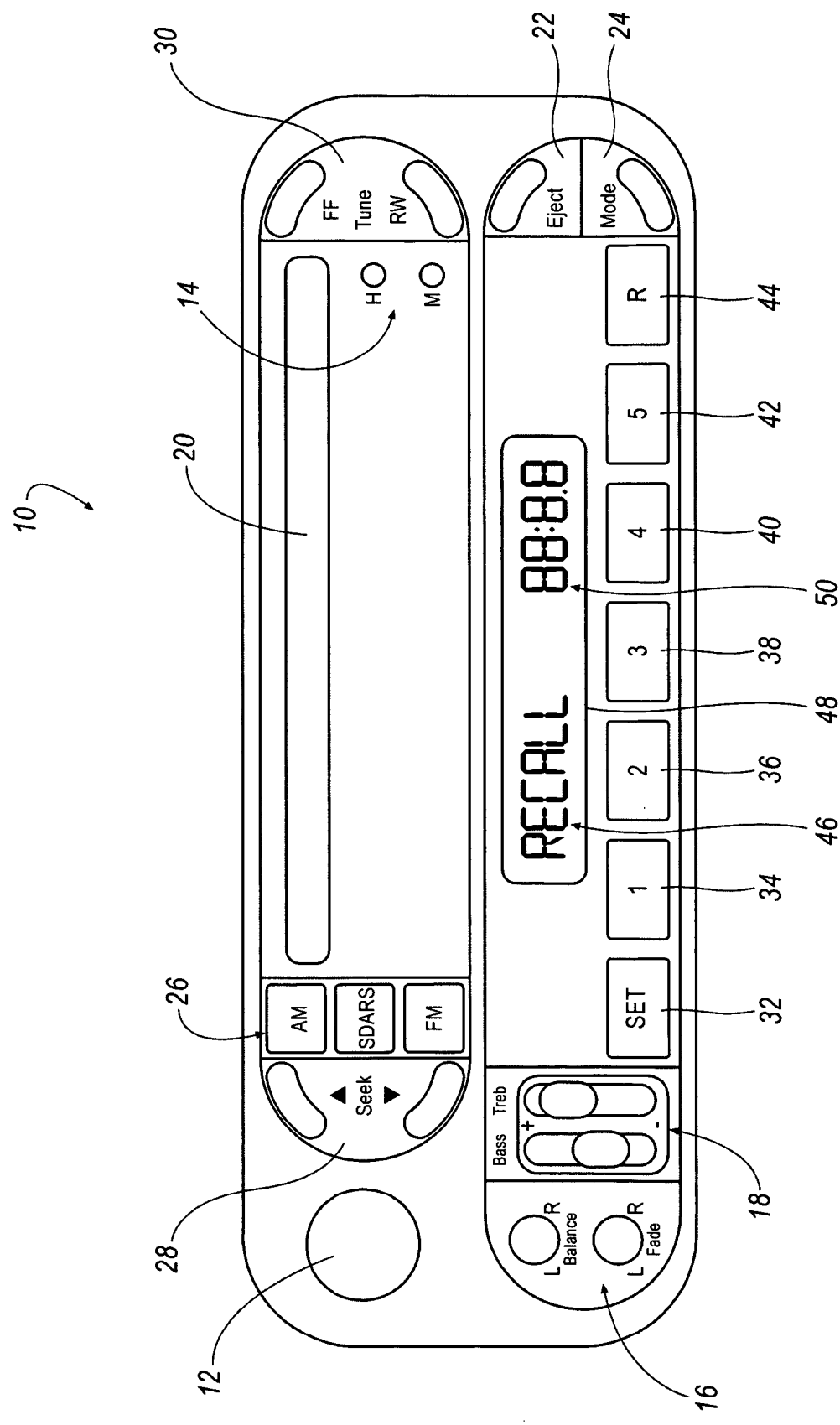
FIG. 1 illustrates a user interface of a receiver according to one embodiment of the invention.

Referring to FIG. 1, a user interface for a receiver is seen generally at 10, according to an embodiment of the invention. The receiver 10 may be used in any desirable application, such as a stationary or mobile application within a home or vehicle, respectively. As illustrated, the receiver 10 includes a plurality of controls, such as a power/volume knob 12, hour and minute time setting buttons 14, audio balance and fade knobs 16, and bass and treble levers 18. The receiver 10 also includes an external audio device port 20, such as, for example, the insertion of a CD, an associated eject button 22 for ejecting the CD from the port 20, and a mode button 24 for switching between CD audio and radio audio. Although not illustrated, the receiver 10 may include a compatible or additional port 20 for cassette tapes, an MP3 device, or the like.

Figures 2, 3A:
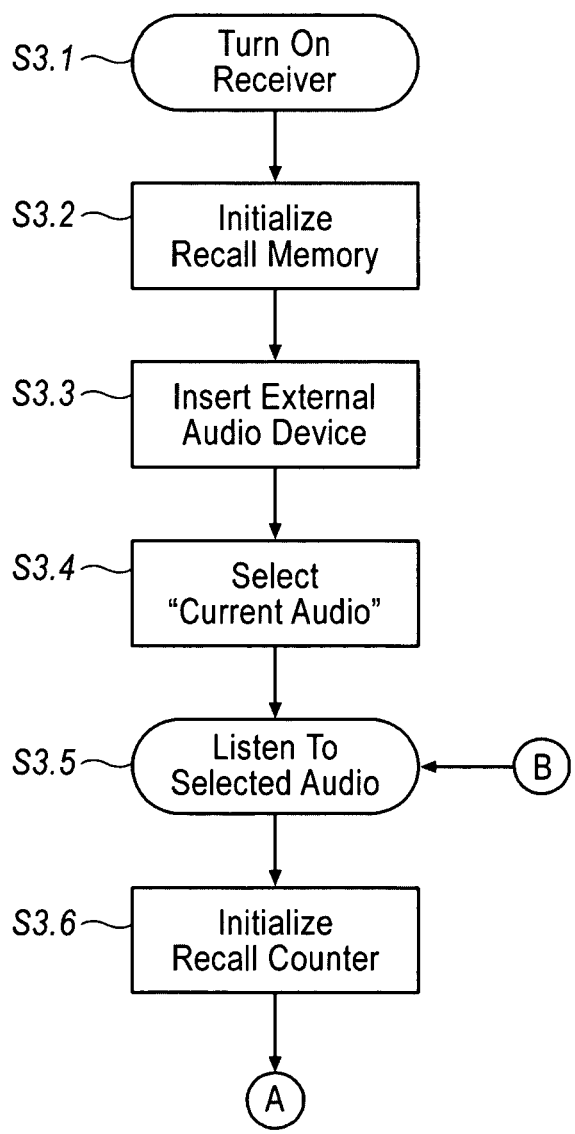
FIG. 2 illustrates a chart of preset buttons and associated radio stations for the receiver according to FIG. 1.
FIGS. 3A and 3B illustrate a flow chart for dynamically coding the receiver of FIG. 1 according to an embodiment of the invention.

The receiver 10 also includes one or a plurality of band-toggle buttons 26, a seek button 28, a tune/fast-forward/rewind button 30, a manual-coding set button 32, and a plurality of manual coding program select preset buttons 34-42. In operation, a user manually codes the preset buttons 34-42 by firstly tuning a radio station by pressing the seek button 28 or tune button 30, then, upon locating a desired radio station, the user beings the manual coding operation by pressing the set button 32 and then pressing the desired preset button 34-42 to associate the desired user-selected station with one of the pressed buttons 34-42. Referring to FIG. 2, a user may repetitiously conduct the above-described manual coding steps for each preset button 34-42 such that each preset button 34-42 may have a preprogrammed AM, FM, and SDARS station. To manually code each preset button for AM, FM, and SDARS, the user must press the band-toggle button 26 to arrive at the appropriate AM, FM, or SDARS band prior to manually coding the desired radio station on the AM, FM, and SDARS band.

As a result, for example, during the operation of the receiver 10, a user may quickly change "current audio" from a station being broadcast on 97.9 MHz to a "new current audio" being broadcast on 101.1 MHz by simply pressing the fifth preset button 42, which thereby obviates the tuning of any intermediate stations between 97.9 MHz and 101.1 MHz. According to the above-described description, "current audio" is defined to mean any type of audio that is being received by the receiver for output by speakers (not shown) to the user prior to the pressing one or more of the buttons 24-44 on the receiver 10 to make a first audio selection, and "new current audio" is defined to mean any type of audio that is being received by the receiver 10 for output by speakers to the user after the user presses one or more of the buttons 24-44 on the receiver to make a second audio selection.

In another embodiment, if the user wishes to tune from "current audio" on station 96.3 MHz to "new current audio" being broadcast on 760 kHz, the user may have to firstly press the band-toggle button 26, which automatically tunes the receiver 10 from "current audio" on 96.3 MHz to "new current audio" on 950 kHz (i.e., since 96.3 MHz and 950 kHz are associated with preset button 38), then, the user may have to press the first preset button 34, which would automatically tune the receiver 10 from "new current audio" on 950 kHz to "new current audio" on 760 kHz. Alternatively, the user may firstly press the first preset button 34 such that "current audio" on station 96.3 MHz is switched to "new current audio" on station 88.7 MHz within the FM band, then, the user presses the band-toggle button 26 such that the "new current audio" is band-changed from 88.7 MHz on the FM band to the desired "new current audio" being broadcast on 760 kHz on the AM band (i.e., since 88.7 MHz and 760 kHz are associated with preset button 34).

According to an embodiment of the invention, an input controller, such as an audio recall button 44, provides additional flexibility for operating the receiver 10. The audio recall button 44, in combination with dynamic coding logic associated with the receiver 10, provides a user with quick access to any type of audio that becomes dynamically associated with the recall button 44. Because the recall button 44 is dynamically coded by logic that is associated with the receiver 10, the recall button 44 is never manually coded by a user. According to another aspect of the invention, the audio recall button 44 may instantaneously recall previously listened-to "current audio" on an AM station when the user is currently listening to "new current audio" on an FM station. In another example, the audio recall button 44 may instantaneously recall previously listened-to "current audio" from a CD, MP3 device, or the like, when the user is listening to "new current audio" being broadcast on an AM band, an FM band, an SDARS band, or the like. As such, the audio recall button 44 is not restricted to recalling "current audio" on different frequency bands, but rather, permits the instantaneous recollection of "current audio" from CD's, MP3's, the AM band, the FM band, the SDARS band, and the like.

Referring initially to FIG. 3A, a method for operating the receiver 10 includes a first step S3.1 for powering on the receiver 10 by pressing the power/volume knob 12. Then, in an optional step at step S3.2, recall memory, which is discussed in greater detail below, may be initialized to include audio information relating to at any desirable radio station, such as, for example, 540 kHz at the end of the AM band. As such, if the recall button 44 is pressed prior to operation of the following method described below at step S3.10, the receiver 10 may identify 540 kHz as "new current audio" even though 540 kHz may never have been actually listened-to. However, it will also be appreciated that the initialization step of S3.2 may be alternatively conducted prior to step S3.1 when the receiver 10 is powered on for the first time; as such, after operating the receiver 10 for a period of time, audio information may remain in recall memory after the receiver 10 is powered off, thereby eliminating the initialization step at S3.2.

Then, at step S3.3, in another optional step, an external audio device, such as a CD (not shown), may be inserted into the external audio device port 20. At step S3.3, although the phrase "insert external audio device" is used to describe the insertion of a CD, being software, step S3.3 is not limited to the insertion of a CD. For example, step S3.3 may also be interpreted to be the interfacing of an external device, such as an MP3 player, a CD changer, or the like, that is interfaced with the receiver 10.

At step S3.4, "current audio" is selected, for example, by pressing the mode button 24 to activate the CD, or, for example, by tuning, seeking, or preset selecting a specified radio station by pressing any one, or a sequential combination of buttons identified at reference numerals 24-42 to choose the "current audio." Then, at step S3.5, the selected "current audio" is evaluated by the receiver 10 and broadcast over speakers to the user. Then, at step S3.6, a recall counter associated with a microprocessor is initialized such that the microprocessor may determine the amount of time the "current audio" is being listened to by a user.

Figure 3B:
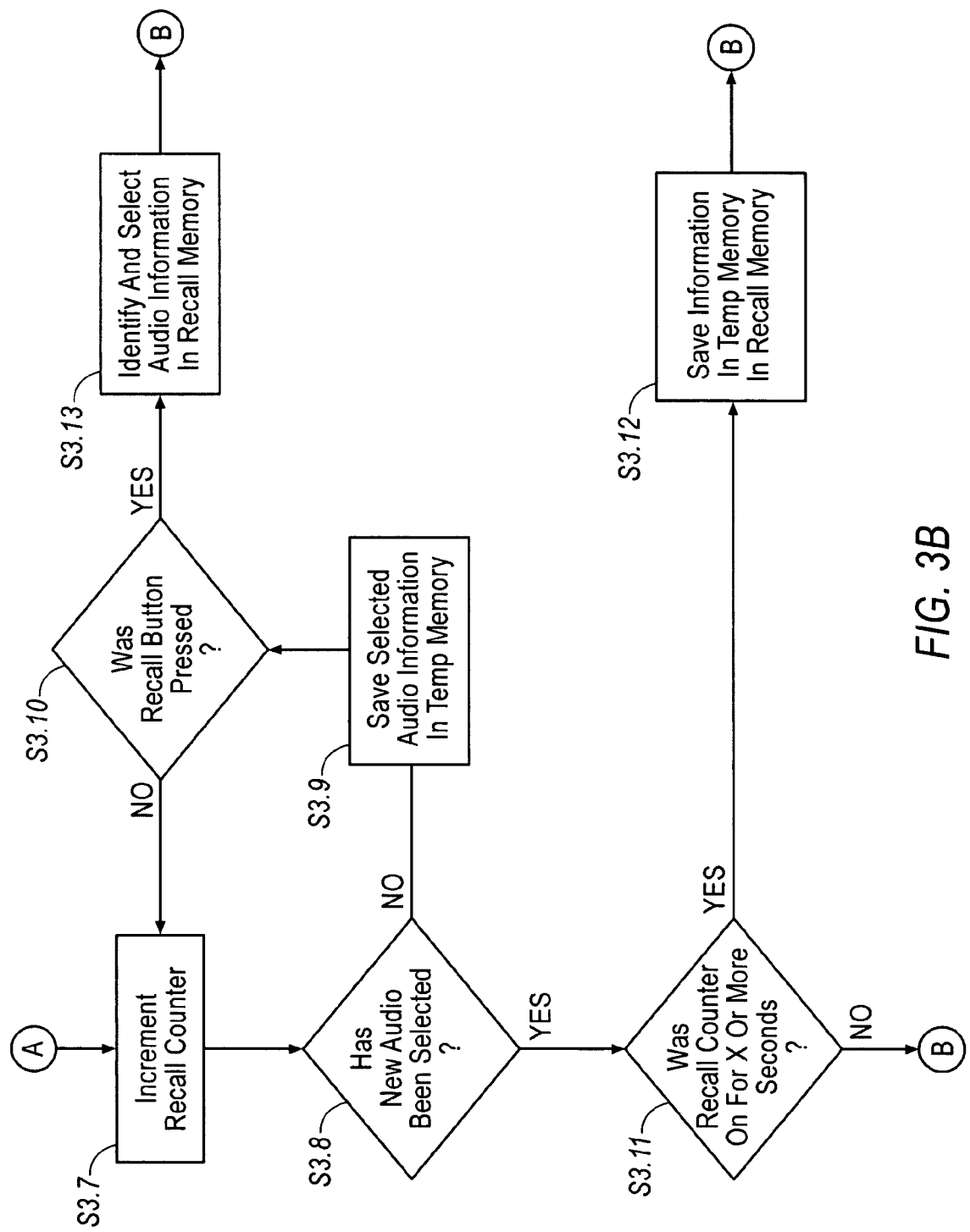

Referring to FIG. 3B, the recall counter is incremented at step S3.7. Upon incrementing the recall counter, the microprocessor makes an inquiry at step S3.8 to see if new audio has been selected. If not, the algorithm is advanced to step S3.9 where audio information relating to the "current audio" is saved in a temporary memory location, which may, for example, be located in the microprocessor. After step S3.9 is completed, the algorithm is advanced to step S3.10 to see of the recall button 44 has been pressed. If not, the algorithm is looped back to step S3.7. Upon new audio being selected at step S3.8, the algorithm is advanced to step S3.11 to determine if the recall counter has been incremented to an "X value" of time that is greater than or equal to X seconds.

It will be appreciated that the invention may be practiced by preprogramming the microprocessor with any desirable amount of time, such as, for example, five or more seconds.

If the recall counter did not reach the X value, the algorithm is looped from step S3.11 to step S3.5; however, if the recall counter did reach the X value, audio information located in the temporary memory location discussed in step S3.9 is saved in the "recall memory" location in the microprocessor at step S3.12 to thereby dynamically code the recall button 44. Information that is stored in recall memory at step S3.12 may include, but is not limited to, an AM station frequency, an FM station frequency, an SDARS station frequency, a CD/MP3 track number, a specific time of a CD/MP3 track number, or the like. After step S3.12, the microprocessor is advanced to back to step S3.5 to repeat the loop again for evaluation of the user-selected "new current audio." Accordingly, if the "new current audio," which is now essentially the second user-selected audio, is listened to for X or more seconds, the recall button 44 may be dynamically re-programmed to be associated with the "new current audio."

Referring to step S3.10, when the recall button 44 is pressed during the operation of the algorithm, the microprocessor identifies the audio information stored in recall memory according to steps S3.2 or S3.12, and then subsequently selects the audio information in recall memory at step S3.13. Upon selecting the audio information in step S3.13, the algorithm is loop back to step S3.5. Accordingly, the audio recall button 44 permits a user to instantaneously select different types of audio with a single, smart, dynamic feature. The smart and dynamic aspects of the audio recall button 44 are different from the preset buttons 34-42 in that the user never manually codes the recall button 44 by associating a specific channel, or even further, an external audio device, such as a CD, with the recall button 44. The software/logic of the microprocessor at steps S3.6-S3.9, S3.11, and S3.12 determines the dynamic coding of the audio recall button 44 by evaluating the length of time a user leaves an audio selection in an enabled state (i.e. when the radio station, CD, or the like, is "on" for a predetermined period of time). As a result, a user may easily return to a listened-to radio station, a CD, or the like, once the user decides that the "new current audio" becomes an undesirable selection under the condition that the previous user-selected audio was in an activated state for X or more seconds.

According to one embodiment of the invention, the "X value" of the recall counter described in step S3.11 may be hard-coded in the microprocessor to be, for example, five minutes (i.e. 300 seconds). In an application, upon activating the receiver 10, a user may insert a CD in the port 20 and listen to the "current audio" of the CD for ten minutes (i.e. 600 seconds). As a result, the "current audio" information of the CD is saved in recall memory because the recall counter is incremented past the preprogrammed "X value" of 300 seconds in step S3.7.

Using the above-identified example of the "X value" being equivalent to 300 seconds, a further application of the invention is described in detail below. At 1:48 PM, for example, the user inserts the CD into port 20 as described above, and at 1:58 PM, for example, the user may notice that the "on-the-hour" news being broadcast on the 950 AM news station is going to occur at 2:00 PM. At approximately 1:58 PM, the user presses the mode button 24 to switch over to the radio function from the CD function of the receiver 10, which was in play for ten minutes, thereby placing the CD "current audio" information in recall memory. Upon pressing the mode button 24, the last radio station listened to was the alternative rock station being broadcast on 88.7 FM, which now becomes the "new current audio," due to the pressing of the mode button 24. Essentially, the moment the user pressed the mode button 24, the recall counter was re-initialized at step S3.6 to determine if information relating to the "new current audio" on 88.7 FM should replace information relating to the "current audio" associated with the CD in the recall memory location. After, for example, two seconds of listening to 88.7 FM, the user presses the AM band-toggle button 26, which results in the switching to 760 AM. Then, the user may press the seek button 28 to quickly tune to 950 AM, surpassing the stations between 760 AM and 950 AM. Upon settling on 950 AM, the recall counter is again re-initialized at step S3.6 and the information relating to 950 AM is now associated with the "new current audio." Then, at 2:02 PM, the "on-the-hour" news of 950 AM is over, and the user presses the recall button 44 to return to the "current audio" of the CD.

Because the period of time that elapsed between the re-initialization of the counter at 1:58 PM (i.e. when the user settled on 950 AM) to the time when the recall button 44 was pressed at 2:02 PM totaled four minutes (i.e. 240 seconds, which is less than the "X value" of 300 seconds), the recall button 44 was dynamically coded and functioned in returning the user to the operation of the CD. However, according to the illustrated embodiment, if the "on-the-hour" news lasted until 2:04 PM, the elapsed listened-to time of 950 AM would have been six minutes (i.e. 360 seconds, which is greater than the "X value" of 300 seconds), and, as a result, audio information relating to 950 AM overwrites the CD information in recall memory. Thus, in this instance, upon pressing the recall button 44, the receiver 10 would have remained at 950 AM due to the logic at step S3.11. Although the above-described function of the recall button 44 is directed to function in the receiver 10 staying on 950 AM after 300 seconds elapsed, it will be appreciated that the algorithm associated with the dynamic programming of the recall button 44 may be altered such that previously listened-to audio, such as 760 AM, in the above-described embodiment, may be returned although 950 AM was on for more than 300 seconds. In relation to the above-described example, it is assumed that the user conducts the switching of audio from the CD to 950 AM in a relatively short period of time, such as, for example, three seconds, thereby allowing the description to assume that the action of switching from "current audio" to "new current audio" took place at a rounded time of 1:58 PM.

Referring back to FIG. 1, to assist the user in operating the recall button 44, indicia 46, such as flashing or constantly visible "RECALL" lettering may appear in an indicia window 48 proximate time or station indicia 50 to indicate when the recall feature is functional (i.e. when step S3.7 increments the recall counter to a time value greater than or equal to the X value). If desired, the time or station indicia 50 may display the audio information stored in recall memory. For instance, according to the example described above, when the CD that was in play for at least 300 seconds, the recall lettering 46 appears in the window 48 and the time indicia 50 may display the track and time number of the CD. Then, when the moment the user switched to 88.7 FM in step S3.8, the time and track number of the CD would be frozen at reference numeral 50 while the recall lettering at reference numeral 46 appeared simultaneously in the window 48. However, as also described above, the time indicia at reference numeral 50 may automatically change to information relating to 950 AM, if, for example, the "on-the-hour" news was on for at least 300 seconds, as described above.

Thus, the user may know exactly what is in recall memory via the time or station indicia displayed at reference numeral 50.

Although the above-described embodiment relates to the recalling of CD information as "current audio," it will be appreciated that the invention may be practiced by recalling radio information as "current audio" to thereby permit the dynamic recalling and switching between radio stations that may or may not be on the same frequency bands. Even further, although the illustrated embodiment has been described with a single external audio port 20 related to a CD, it will be appreciated that the invention may be practiced with any desirable external audio component, such as an MP3 player, or the like. Even further, although only one audio port 20 is shownt in the illustrated embodiment, a plurality of audio ports for different external audio devices may be employed as well. Even further, although the single audio port 20 is illustrated, the invention also contemplates recognition of external hard-wire audio devices, such as CD-changers, SDARS receivers, such as SKYFI®, which may be located remote from the typical location of the receiver 10 in the instrument panel.

It will also be appreciated that although the illustrated embodiment is related to a recall button 44 located on a receiver 10, the recall button 44 may be located remotely from the receiver 10, such as, for example, proximate a vehicle's steering wheel with associated audio-control devices. Yet even further, it will be appreciated that the invention is not limited to a recall button 44, per se, and that any desirable input controller may be used in causing selection of a type of audio identified in recall memory. For example, rather than providing a recall button 44, a voice recognition system (not shown) may be employed as an input device such that when a user speaks, for example, the word "recall," the voice recognition system may provide the input at step S3.10 to function in recalling user-selected audio as described above rather than having a user physically press the button 44. Additionally, it is contemplated that the recall memory may be arrayed such that recall memory may store multiple user-selected audio information. Thus, as a result, the recall button 44 may function in toggling between a library of "favorite" user-selected audio.

While the invention has been specifically described in connection with certain specific embodiments thereof, it is to be understood that this is by way of illustration and not of limitation, and the scope of the appended claims should be construed as broadly as the prior art will permit.

What is claimed is:

1. A system that provides quick access to previously selected audio comprising:
    processor logic that evaluates at least a first user-selected audio that has been previously enabled and a second user-selected audio that is currently enabled, wherein the processor logic is associated with a radio receiver;
    an input controller that is dynamically-coded by the processor logic for recalling audio information associated with the first user-selected audio when the second user-selected audio is being evaluated by the processor logic based upon the length of time the second user selected audio remains in an enabled state; and
    wherein the input controller is an audio recall button located on a user-interface of the receiver and the user-interface includes an indicia window that displays recall information stored in memory of a processor and the recall information is displayed during the evaluation of the second user-selected audio.

2. The system according to claim 1, wherein the first and second user-selected audio includes compact disc audio, MP3 audio, audio being broadcast on a frequency associated with an AM band, an FM band, or an SDARS band.

3. A method for providing quick access to previously selected audio comprising the steps of:
- evaluating a first user-selected audio that has been previously enabled;
- evaluating a second user-selected audio that is currently enabled;
- dynamically-coding an input controller for recalling audio information associated with the first user-selected audio when the second user-selected audio is being evaluated by determining the length of time the second user-selected audio remains in an enabled state; and
- displaying the audio information associated with the first user-selected audio during the evaluation of the second user-selected audio.

4. The method according to claim 3, wherein the evaluating a first user-selected audio step further comprising the step of determining a period of time the first user-selected audio has been selected.

5. The method according to claim 4, wherein, if the first user-selected audio is selected for at least a predetermined period of time, further comprising the step of saving the audio information associated with the first user-selected audio in a recall memory location.

6. The method according to claim 3 further comprising the step of activating the dynamically-coded input controller to identify and cause selection of the audio information associated with the first user-selected audio in the recall memory location.

7. The method according to claim 3 further comprising the step of displaying the audio information associated with the first user-selected audio in the recall memory location in an indicia window of a receiver.

8. A system that provides quick access to previously selected audio in an audio device comprising:
- processor logic that evaluates a first user-selected audio that has been previously enabled in the audio device and a second user-selected audio that is currently enabled in the audio device;
- an input controller for recalling audio information associated with the first user-selected audio when the second user-selected audio is being evaluated by the processor logic based upon the length of time the second user selected audio remains in an enabled state; and
- wherein the input controller is an audio recall button located on a user-interface that provides information to an indicia window for displaying recall information about the first user-selected audio stored in memory of a processor during the evaluation of the second user-selected audio.

* * * * *